(12) United States Patent
Takahashi et al.

(10) Patent No.: US 6,218,789 B1
(45) Date of Patent: Apr. 17, 2001

(54) METAL HALIDE LAMP HAVING SPECIFIED RELATION BETWEEN ELECTRODE DISTANCE AND OPERATION VOLTAGE, AND OPERATING AT ACOUSTIC STANDING WAVE FREQUENCY

(75) Inventors: Kiyoshi Takahashi, Osaka; Makoto Horiuchi, Sakurai; Mamoru Takeda, Kyoto; Makoto Kai, Osaka; Kouji Miyazaki, Kyoto; Satoshi Kominami, Osaka, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/170,107

(22) Filed: Oct. 13, 1998

(30) Foreign Application Priority Data

Sep. 6, 1996 (JP) .................................... 8 236349

(51) Int. Cl.⁷ ...................................................... H05B 37/00
(52) U.S. Cl. ...................... 315/246; 315/209 R; 313/637; 313/643
(58) Field of Search ............................... 315/246, 209 R; 313/637, 638, 639, 643

(56) References Cited

U.S. PATENT DOCUMENTS

| | | | |
|---|---|---|---|
| 3,927,343 | * 12/1975 | Beijer et al. | 313/214 |
| 4,047,069 | * 9/1977 | Akutsu et al. | 313/487 |
| 5,773,937 | * 6/1998 | Miyazaki et al. | 315/246 |
| 5,814,944 | * 9/1998 | Saito et al. | 313/638 |
| 5,880,561 | * 3/1999 | Miyazaki et al. | 315/209 R |

FOREIGN PATENT DOCUMENTS

| | | |
|---|---|---|
| 3-219546 | 9/1991 | (JP) . |
| 4-298994 | 10/1992 | (JP) . |
| 6-314555 | 11/1994 | (JP) . |
| 9-97591 | 4/1997 | (JP) . |

* cited by examiner

Primary Examiner—David Vu
(74) Attorney, Agent, or Firm—Parkhurst & Wendel, LLP

(57) ABSTRACT

A metal halide lamp includes an arc tube containing at least mercury and metal halide. A pair of opposed main electrodes extend in the arc tube. A lamp voltage is applied between the main electrodes. The main electrodes have respective distal ends which are spaced from each other by a predetermined distance "d". The predetermined distance "d" and the lamp voltage "Vla" which occurs during stable rated operation of the lamp satisfy a relation as follows:

Vla/d ≦24(V/mm)

8 Claims, 5 Drawing Sheets

METAL HALIDE LAMP HAVING SPECIFIED RELATION BETWEEN ELECTRODE DISTANCE AND OPERATION VOLTAGE, AND OPERATING AT ACOUSTIC STANDING WAVE FREQUENCY

BACKGROUND OF THE INVENTION

1. Field of the Invention

This invention relates to a metal halide lamp which can be used as a light source in various apparatuses such as liquid-crystal projectors and lighting equipments.

2. Description of the Related Art

Liquid-crystal projectors enlarge images of characters and figures, and project and display the enlarged images. In general, light sources in the liquid-crystal projectors are required to output light at given power levels. Since metal halide lamps have high luminous efficiencies and excellent color rendering performances, they are frequently used as light sources in the liquid-crystal projectors.

Japanese published unexamined patent application 3-219546 discloses a metal halide lamp having an arc tube filled with metal halide. In the lamp of Japanese application 3-219546, the metal halide uses iodide or bromide containing neodymium, dysprosium, or cesium.

In general, metal halide lamps are operated by rectangular electric waves having low frequencies equal to about 200 Hz. It is known to operate metal halide lamps by electric power having high frequencies. In this case, operation circuits for the metal halide lamps can be miniaturized.

When a metal halide lamp is operated by high-frequency electric power, an arc therein and a light emitting region around the arc tend to waver. Thus, in this case, resultant light outputted from the metal halide lamp tends to flicker.

Even when a metal halide lamp is operated by low-frequency rectangular electric wave, an arc therein sometimes flickers.

SUMMARY OF THE INVENTION

It is an object of this invention to provide a metal halide lamp which can develop a stable arc.

A first aspect of this invention provides a metal halide lamp comprising an arc tube containing at least mercury and metal halide; a pair of opposed main electrodes extending in the arc tube; means for applying a lamp voltage between the main electrodes; wherein the main electrodes have respective distal ends which are spaced from each other by a predetermined distance "d", and the predetermined distance "d" and the lamp voltage "Vla" which occurs during stable rated operation of the lamp satisfy a relation as follows:

$Vla/d \leq 24 (V/mm)$

A second aspect of this invention is based on the first aspect thereof, and provides a metal halide lamp wherein the lamp-voltage applying means comprises means for applying an electric operation signal between the main electrodes, the electric operation signal having a predetermined frequency at which an acoustic standing wave occurs in a direction perpendicular to a direction of an axis connecting the main electrodes.

A third aspect of this invention is based on the first aspect thereof, and provides a metal halide lamp wherein the arc tube develops an arc therein, and the metal halide comprises molecule emitting light in a region around the arc.

A fourth aspect of this invention is based on the first aspect thereof, and provides a metal halide lamp wherein the metal halide contains at least one of La, Gd, Tb, Dy, Ho, Er, Tm, Yb, and Lu.

A fifth aspect of this invention is based on the first aspect thereof, and provides a metal halide lamp wherein the predetermined distance "d" is equal to or less than 5 mm.

DESCRIPTION OF THE PREFERRED EMBODIMENTS

First Embodiment

Figure 1:
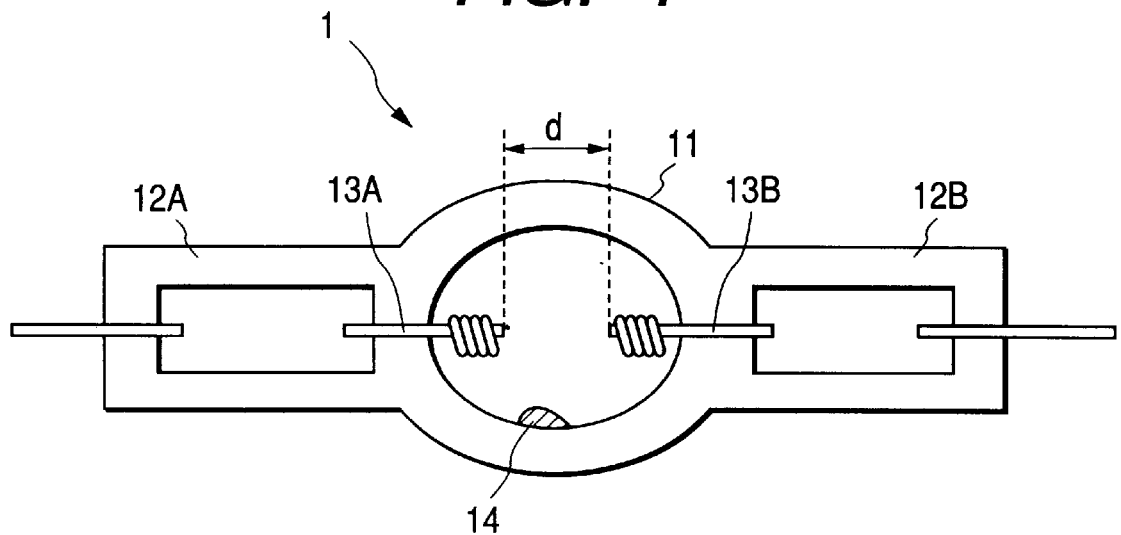
FIG. 1 is a sectional diagram of a metal halide lamp according to a first embodiment of this invention.

FIG. 1 shows a metal halide lamp 1 according to a first embodiment of this invention. The metal halide lamp 1 includes an arc tube 11 having walls made of quartz. The inner surfaces of the first walls of the arc tube 11 are approximately spherical. The inside diameter of the arc tube 11 is equal to 10 mm. Opposite ends 12A and 12B of the arc tube 11 contain electrodes 13A and 13B, respectively.

The following description is of the left side of FIG. 1; a discussion of the right side will follow. The electrode 13A includes a rod made of tungsten and having a diameter of 0.9 mm. The electrode rod extends from an interior of the arc tube 11 into the walls of the tube end 12A. The electrode 13A also includes six turns of a tungsten wire around an end portion of the rod which is located in the interior of the arc tube 11. The tungsten wire has a diameter of 0.25 mm. The tungsten wire is electrically connected to the electrode rod. The electrode 13A is airtightly supported by the walls of the tube end 12A.

Similarly, the electrode 13B includes a rod made of tungsten and having a diameter of 0.9 mm. The electrode rod extends from an interior of the arc tube 11 into the walls of the tube end 12B. The electrode 13B also includes six turns of a tungsten wire around an end portion of the rod which is located in the interior of the arc tube 11. The tungsten wire has a diameter of 0.25 mm. The tungsten wire is electrically connected to the electrode rod. The electrode 13B is airtightly supported by the walls of the tube end 12B.

In the interior of the arc tube 11, the electrodes 13A and 13B are spaced from each other by a distance "d" of 3.7 mm. Specifically, the electrodes 13A and 13B have respective distal ends which are opposed to each other, and which are spaced from each other by the distance "d". The arc tube 11 is filled with substances 14 as follows. Argon gas is placed in the arc tube 11. The amount of argon gas in the arc tube 11 corresponds to a pressure of 200 Torr at a temperature of 300 K (that is, a room temperature or an ordinary temperature). Mercury being 35 mg in weight is placed in the arc tube 11. Indium iodide being 0.4 mg in weight is placed in the arc tube 11. Holmium iodide being 1 mg is placed in the arc tube 11.

The distance "d" between the electrodes 13A and 13B may be different from 3.7 mm. It is preferable that the distance "d" is equal to or less than 5 mm.

Figure 2:
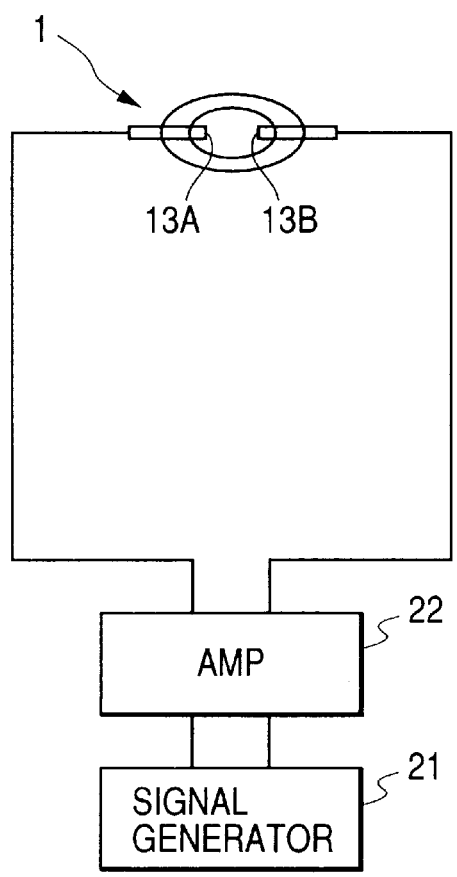
FIG. 2 is a diagram of an operation system and the metal halide lamp of FIG. 1.

Experiments were performed on the metal halide lamp 1. During the experiments, the metal halide lamp 1 was operated by an operation system in FIG. 2. The operation system included a signal generator 21, and an amplifier 22 connected to the signal generator 21. The amplifier 22 was connected to the electrodes 13A and 13B of the metal halide lamp 1. The signal generator 21 produced and outputted an electric signal having a variable frequency and a variable waveform. The output signal of the generator 21 was fed to the amplifier 22, being enlarged thereby. The amplifier 22 applied the resultant signal between the electrodes 13A and 13B of the metal halide lamp 1 as an electric operation signal. Therefore, the metal halide lamp 1 was operated.

During the experiments, the frequency of the electric operation signal applied to the metal halide lamp 1 was varied while the waveform thereof remained fixed to a sinusoidal shape. During the experiments, the stability of an arc developed in the metal halide lamp 1 was evaluated.

Figure 3:
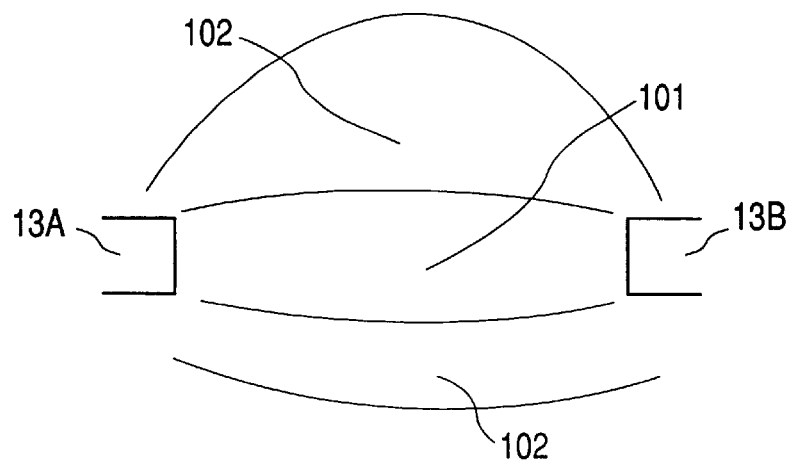
FIG. 3 is a diagram of an arc and a molecular light emission region around the arc in the metal halide lamp of FIG. 1.

In the metal halide lamp 1, when the frequency of the electric operation signal was equal to about 16 kHz, an acoustic standing wave occurred in a direction perpendicular to the axis connecting the electrodes 13A and 13B. FIG. 3 shows an arc 101 developed in that condition. As shown in FIG. 3, the arc 101 was surrounded by a peripheral region 102 which emitted red light being holmium molecular emission light. The frequency of the electric operation signal applied to the metal halide lamp 1 was varied. When the frequency of the electric operation signal reached a certain value, the arc-periphery light emission region 102 wavered so that the resultant light outputted from the metal halide lamp 1 flickered.

Figure 4:
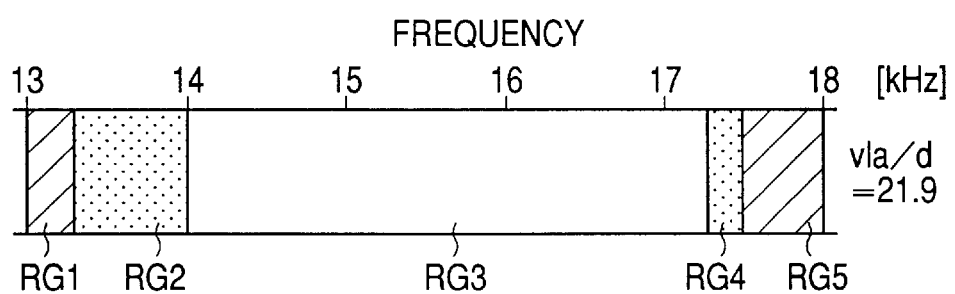
FIG. 4 is a diagram of the relation between the frequency of an electric operation signal and the conditions of an arc and an arc-periphery light emission region in the metal halide lamp of FIG. 1.

While the frequency of the electric operation signal applied to the metal halide lamp 1 was varied between 13 kHz and 18 kHz, the stability of the light output of the arc therein was evaluated. FIG. 4 shows the relation between the stability of the light output of the arc and the frequency of the electric operation signal. With reference to FIG. 4, in frequency ranges RG1 and RG5, the arc deformed or wavered. In frequency ranges RG2 and RG4, the arc-periphery light emission region wavered although the arc was stable. In a frequency range RG3, both the arc and the arc-periphery light emission region were stable. Under a typical example (a rated example) of the operating conditions where the arc in the metal halide lamp 1 was stable, a lamp voltage Vla was equal to 81.0 V and the ratio "Vla/d" was equal to 21.9 (V/mm).

Sample metal halide lamps were made. The sample metal halide lamps were similar to the metal halide lamp 1 except for the distance "d" between the electrodes and the amount of mercury in the arc tube. Regarding the sample metal halide lamps, measurements were given of ranges of the frequency of the electric operation signal where the light output of the arc was stable. In the sample metal halide lamps, the distance "d" between the electrodes was equal to 3.0–5.0 mm, and the amount of mercury therein was equal to 30–50 mg.

Figure 5:
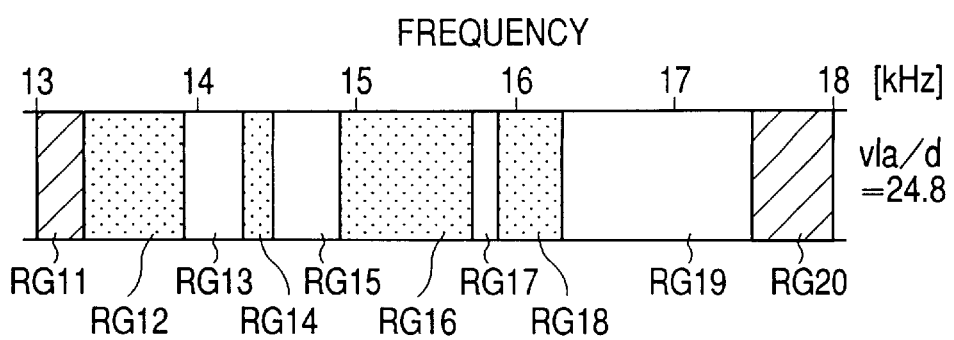
FIG. 5 is a diagram of the relation between the frequency of an electric operation signal and the conditions of an arc and an arc-periphery light emission region in a sample metal halide lamp.

Regarding one of the sample metal halide lamps, the stability of the light output of the arc therein was evaluated while the frequency of the electric operation signal was varied between 13 kHz and 18 kHz. FIG. 5 shows the relation between the stability of the light output of the arc and the frequency of the electric operation signal. With reference to FIG. 5, in frequency ranges RG11 and RG20, the arc deformed or wavered. In frequency ranges RG12, RG14, RG16, and RG18, the arc-periphery light emission region wavered although the arc was stable. In frequency ranges RG13, RG15, RG17, and RG19, both the arc and the arc-periphery light emission region were stable. In the sample metal halide lamp, the ratio "Vla/d" was equal to 24.8(V/mm). As understood from FIGS. 4 and 5, the sample metal halide lamp was similar to the metal halide lamp 1 in frequency ranges where the arc deformed or wavered. On the other hand, the sample metal halide lamp was considerably different from the metal halide lamp 1 in frequency ranges where the arc-periphery light emission region wavered although the arc was stable.

Figure 6:
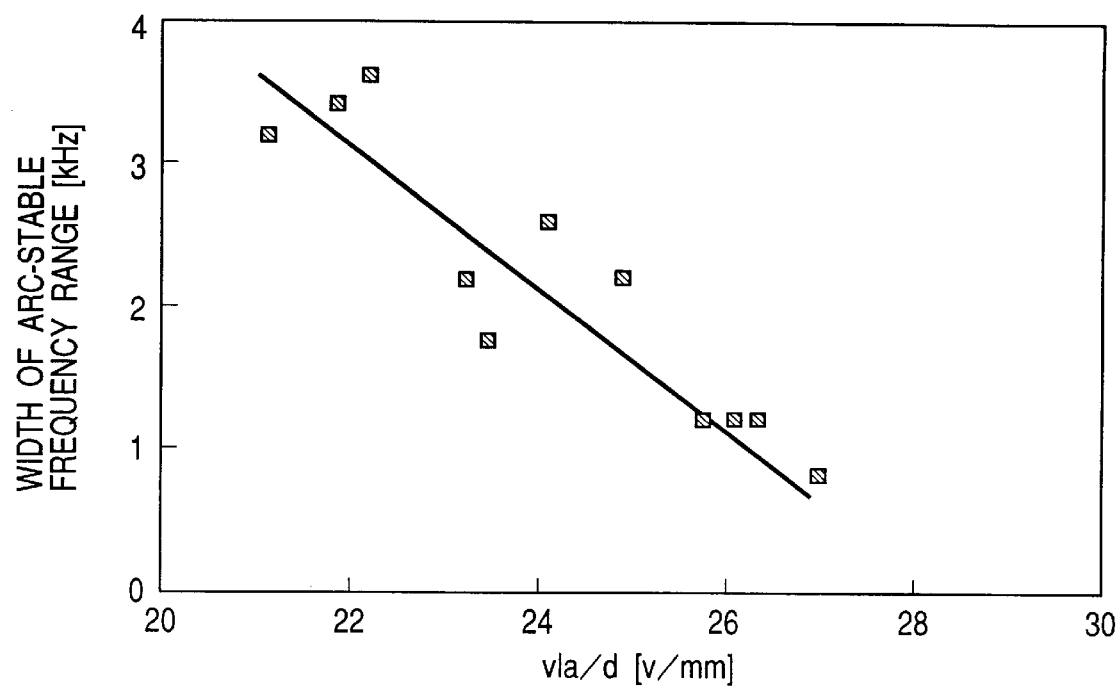
FIG. 6 is a diagram of the relation between a ratio "Vla/d" and an arc-stable frequency range width.

Similarly, the other sample metal halide lamps were evaluated. The relation between the ratio "Vla/d" and the width of the frequency range of the electric operation signal in which the arc was stable was derived from the evaluation of the sample metal halide lamps. FIG. 6 shows the derived relation between the ratio "Vla/d" and the arc-stable frequency range width. As shown in FIG. 6, the arc-stable frequency range width was determined by the ratio "Vla/d". Specifically, the arc-stable frequency range width increased as the ratio "Vla/d" decreased.

In the case where the metal halide lamp 1 continued to be operated by an electric operation signal having a frequency at which the arc was stable, the lamp brilliant point started to move and the arc-periphery light emission region started to waver when the lamp voltage Vla rose and the ratio "Vla/d" exceeded 24(V/mm). Accordingly, it is preferable to operate the metal halide lamp 1 under conditions which satisfy the following relation.

$$Vla/d \leq 24 \tag{1}$$

As long as the relation (1) was satisfied, both the arc and the arc-periphery light emission region remained stable until the end of the life of the metal halide lamp 1.

Reference metal halide lamps were made. The reference metal halide lamps were similar to the metal halide lamp 1 and the sample metal halide lamps except that the amount of iodide in the arc tube was doubled. Experiments similar to the previously-mentioned experiments were performed on the reference metal halide lamps. The derived relation between the ratio "Vla/d" and the arc-stable frequency range width in the reference metal halide lamps was similar to that in the sample metal halide lamps. Thus, as long as the relation (1) was satisfied, both the arc and the arc-periphery light emission region were prevented from wavering regardless of the amount of iodide in the arc tube.

As previously indicated, both the arc and the arc-periphery light emission region are stable in the case where the ratio "Vla/d" is equal to or less than 24 (V/mm).

According to a modification of the metal halide lamp 1, the halide in the arc tube 11 contains at least one of La, Gd, Tb, Dy, Ho, Er, Tm, Yb, and Lu. This modified metal halide lamp provides strong molecular light emission extending in a wide area. Therefore, the light output of the modified metal halide lamp tends to be affected by even slight waver of the molecular light emission area. It is preferable for the modified metal halide lamp to satisfy the previously-indicated relation (1).

In the case where the sample metal halide lamp having a ratio "Vla/d" of 28 (V/mm) continued to be operated by rectangular electric wave with a frequency of 250 Hz, the arc-periphery light emission region started to waver when the duration of the operation of the lamp reached 1,000 hours. On the other hand, in the case where the sample metal halide lamp having a ratio "Vla/d" of 20 (V/mm) continued to be operated by rectangular electric wave with a frequency of 250 Hz, both the arc and the arc-periphery light emission region remained stable until the end of the life of the lamp.

Second Embodiment

Figure 7:
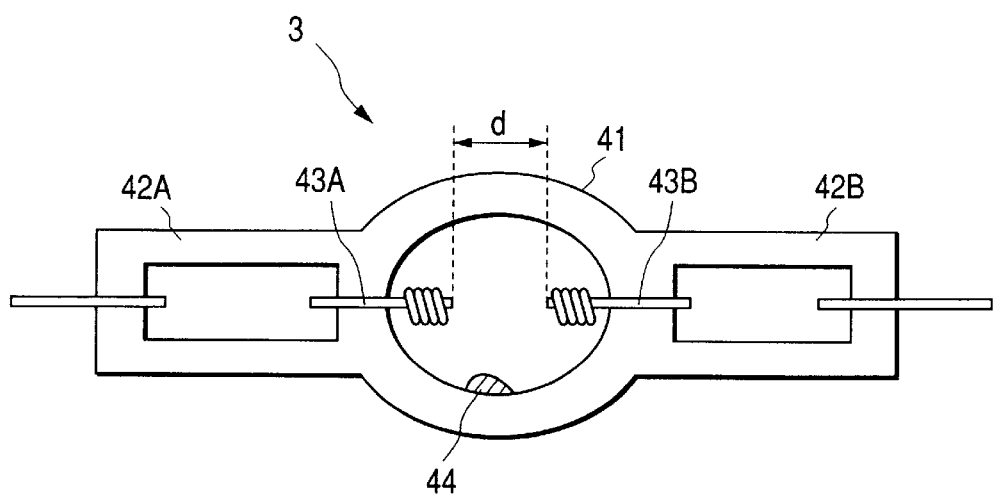
FIG. 7 is a sectional diagram of a metal halide lamp according to a second embodiment of this invention.

FIG. 7 shows a metal halide lamp 3 according to a second embodiment of this invention. The metal halide lamp 3 includes an arc tube 41 having walls made of quartz. The inner surfaces of the walls of the arc tube 41 are approximately spherical. The inside diameter of the arc tube 41 is equal to 10 mm. Opposite ends 42A and 42B of the arc tube 41 contain electrodes 43A and 43B, respectively. The electrodes 43A and 43B are similar to the electrodes 13A and 13B in FIG. 1, respectively.

In the interior of the arc tube 41, the electrodes 43A and 43B are spaced from each other by a distance "d" of 3.7 mm. The arc tube 41 is filled with substances 44 as follows. Argon gas is placed in the arc tube 41. The amount of argon gas in the arc tube 41 corresponds to a pressure of 200 Torr at a temperature of 300 K (that is, a room temperature or an ordinary temperature). Mercury being 35 mg in weight is placed in the arc tube 41. Dysprosium iodide being 0.7 mg in weight is placed in the arc tube 41. Neodymium iodide being 0.7 mg in weight is placed in the arc tube 41. Cesium iodide being 0.6 mg in weight is placed in the arc tube 41.

The distance "d" between the electrodes 43A and 43B may be different from 3.7 mm. It is preferable that the distance "d" is equal to or less than 5 mm.

Experiments were performed on the metal halide lamp 3. During the experiments, the metal halide lamp 3 was operated by the operation system in FIG. 2. The frequency of the electric operation signal applied to the metal halide lamp 3 was varied while the waveform thereof remained fixed to a sinusoidal shape. During the experiments, the stability of an arc developed in the metal halide lamp 3 was evaluated.

Figure 8:
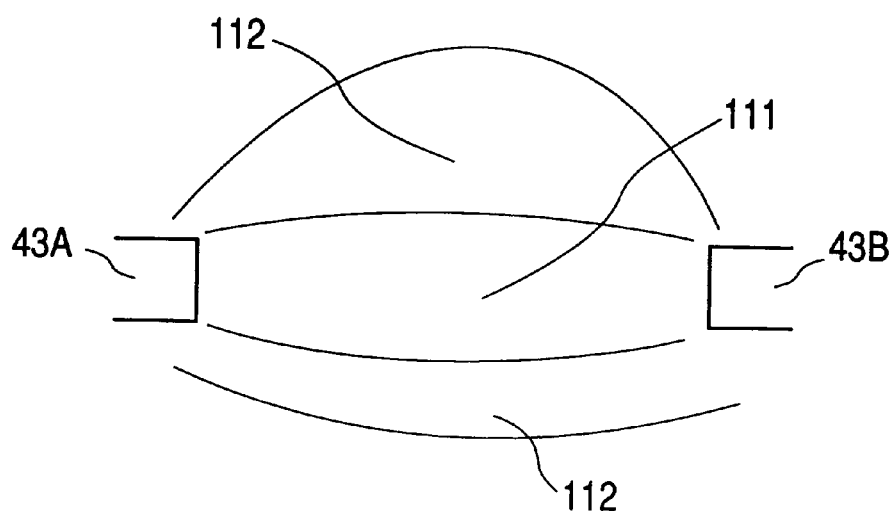
FIG. 8 is a diagram of an arc and a molecular light emission region around the arc in the metal halide lamp of FIG. 7.

In the metal halide lamp 3, when the frequency of the electric operation signal was equal to about 16 kHz, an acoustic standing wave occurred in a direction perpendicular to the axis connecting the electrodes 43A and 43B. FIG. 8 shows an arc 111 developed in that condition. As shown in FIG. 8, the arc 111 was surrounded by a peripheral region 112 which emitted red light being dysprosium molecular emission light. The frequency of the electric operation signal applied to the metal halide lamp 3 was varied. When the frequency of the electric operation signal reached a certain value, the arc-periphery light emission region 112 wavered so that the resultant light outputted from the metal halide lamp 3 flickered.

Figure 9:
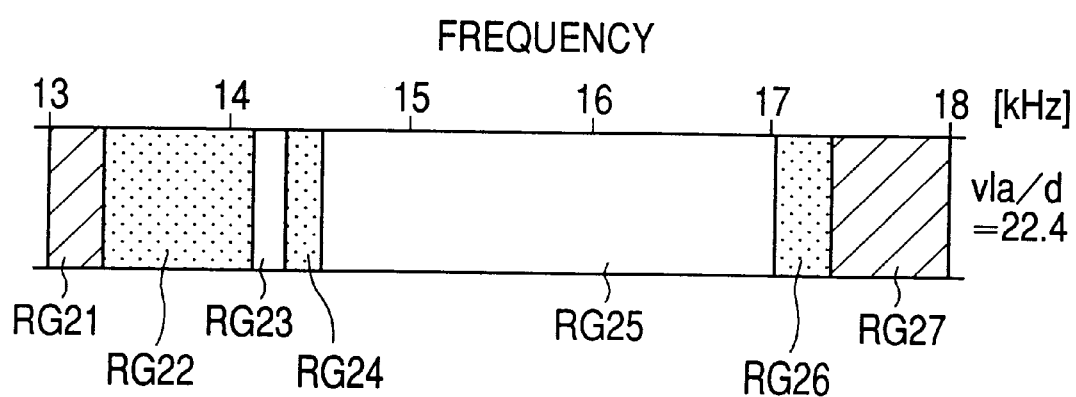
FIG. 9 is a diagram of the relation between the frequency of an electric operation signal and the conditions of an arc and an arc-periphery light emission region in the metal halide lamp of FIG. 7.

While the frequency of the electric operation signal applied to the metal halide lamp 3 was varied between 13 kHz and 18 kHz, the stability of the light output of the arc therein was evaluated. FIG. 9 shows the relation between the stability of the light output of the arc and the frequency of the electric operation signal. With reference to FIG. 9, in frequency ranges RG21 and RG27, the arc deformed or wavered. In frequency ranges RG22, RG24, and RG26, the arc-periphery light emission region wavered although the arc was stable. In frequency ranges RG23 and RG25, both the arc and the arc-periphery light emission region were stable. Under a typical example (a rated example) of the operating conditions where the arc in the metal halide lamp 3 was stable, the ratio "Vla/d" was equal to 22.4 (V/mm).

Sample metal halide lamps were made. The sample metal halide lamps were similar to the metal halide lamp 3 except for the distance "d" between the electrodes and the amount of mercury in the arc tube. Regarding the sample metal halide lamps, measurements were given of ranges of the frequency of the electric operation signal where the light output of the arc was stable. In the sample metal halide lamps, the distance "d" between the electrodes was equal to 3.0–5.0 mm, and the amount of mercury therein was equal to 30–50 mg.

Figure 10:
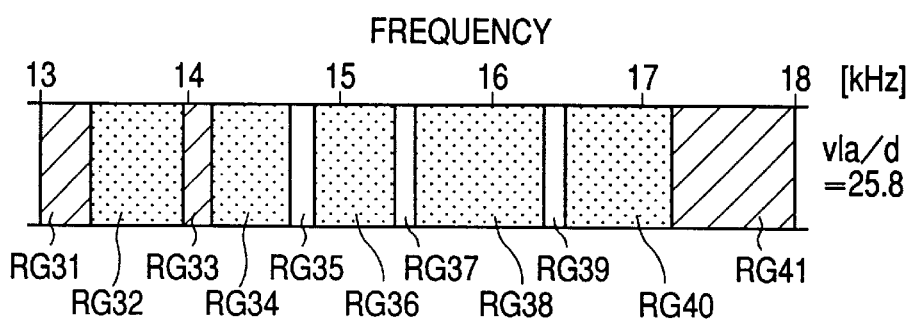
FIG. 10 is a diagram of the relation between the frequency of an electric operation signal and the conditions of an arc and an arc-periphery light emission region in a sample metal halide lamp.

Regarding one of the sample metal halide lamps, the stability of the light output of the arc therein was evaluated while the frequency of the electric operation signal was varied between 13 kHz and 18 kHz. FIG. 10 shows the relation between the stability of the light output of the arc and the frequency of the electric operation signal. With reference to FIG. 10, in frequency ranges RG31, RG33, and RG41, the arc deformed or wavered. In frequency ranges RG32, RG34, RG36, RG38, and RG40, the arc-periphery light emission region wavered although the arc was stable. In frequency ranges RG35, RG37, and RG39, both the arc and the arc-periphery light emission region were stable. In the sample metal halide lamp, the ratio "Vla/d" was equal to 25.8 (V/mm). As understood from FIGS. 9 and 10, the sample metal halide lamp was similar to the metal halide lamp 3 in frequency ranges where the arc deformed or wavered. On the other hand, the sample metal halide lamp was considerably different from the metal halide lamp 3 in frequency ranges where the arc-periphery light emission region wavered although the arc was stable.

Figure 11:
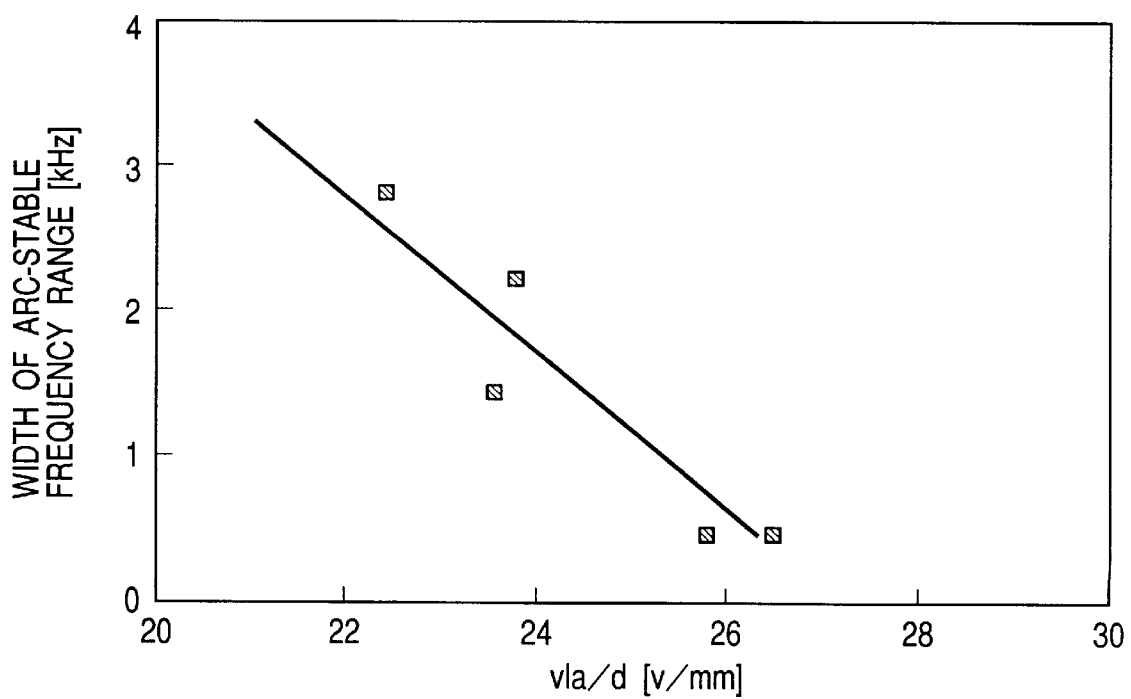
FIG. 11 is a diagram of the relation between a ratio "Vla/d" and an arc-stable frequency range width.

Similarly, the other sample metal halide lamps were evaluated. The relation between the ratio "Vla/d" and the width of the frequency range of the electric operation signal in which the arc was stable was derived from the evaluation of the sample metal halide lamps. FIG. 11 shows the derived relation between the ratio "Vla/d" and the arc-stable frequency range width. As shown in FIG. 6, the arc-stable frequency range width was determined by the ratio "Vla/d". Specifically, the arc-stable frequency range width increased as the ratio "Vla/d" decreased. A similar relation between the ratio "Vla/d" and the arc-stable frequency range width was provided even when the substances in the arc tube were replaced by other substances.

In the case where the metal halide lamp 3 continued to be operated by an electric operation signal having a frequency at which the arc was stable, the lamp brilliant point abruptly started to move and the arc-periphery light emission region started to waver when the lamp voltage Vla rose and the ratio "Vla/d" exceeded 24 (V/mm). Accordingly, it is preferable to operate the metal halide lamp 3 under conditions which satisfy the previously-indicated relation (1). As long as the relation (1) was satisfied, both the arc and the arc-periphery light emission region remained stable until the end of the life of the metal halide lamp 3.

According to a modification of the metal halide lamp 3, the halide in the arc tube 41 contains at least one of La, Gd, Tb, Dy, Ho, Er, Tm, Yb, and Lu. This modified metal halide lamp provides strong molecular light emission extending in a wide area. Therefore, the light output of the modified metal halide lamp tends to be affected by even slight waver of the molecular light emission area. It is preferable for the modified metal halide lamp to satisfy the previously-indicated relation (1).

In the case where the sample metal halide lamp having a ratio "Vla/d" of 28 (V/mm) continued to be operated by rectangular electric wave with a frequency of 250 Hz, the arc-periphery light emission region started to waver when the duration of the operation of the lamp reached 1,000 hours. On the other hand, in the case where the sample metal halide lamp having a ratio "Vla/d" of 20 (V/mm) continued to be operated by rectangular electric wave with a frequency of 250 Hz, both the arc and the arc-periphery light emission region remained stable until the end of the life of the lamp.

What is claimed is:

1. A metal halide lamp comprising:

an arc tube containing at least mercury and metal halide;

a pair of opposed main electrodes extending in the arc tube; and means for applying a lamp voltage between the main electrodes;

wherein (1) the main electrodes have respective distal ends which are spaced from each other by a predetermined distance "d", and the predetermined distance "d" and the lamp voltage "Vla" which occurs during stable rated operation of the lamp satisfy a relation as follows:

$$Vla/d \leq 24 (V/mm)$$

and (2) the lamp-voltage applying means comprises means for applying an electric operation signal between the opposed main electrodes, the electric operation signal having a predetermined frequency at which an acoustic standing wave occurs in a direction perpendicular to a direction of an axis connecting the opposed main electrodes.

2. A metal halide lamp as recited in claim 1, wherein the arc tube develops an arc therein, and the metal halide comprises molecule emitting light in a region around the arc.

3. A metal halide lamp as recited in claim 1, wherein the metal halide contains at least one of La, Gd, Tb, Dy, Ho, Er, Tm, Yb, and Lu.

4. A metal halide lamp as recited in claim 1, wherein the predetermined distance "d" is equal to or less than 5 mm.

5. A metal halide lamp as recited in claim 1, wherein the predetermined distance "d" is 3.7 mm.

6. A metal halide lamp as recited in claim 1, wherein the opposed main electrodes are made of tungsten and have a diameter of 0.9 mm, and the electrodes have at their distal ends a tungsten wire of 0.25 mm thick coiled six times.

7. The metal halide lamp as recited in claim 1, wherein the arc tube has approximately spherical walls of quartz with a diameter of 10 mm, and the tube is filled with argon gas, of 200 Torr at 300° K, 35 mg of mercury, 0.4 mg of indium iodine, and 1 mg of holmium iodine.

8. The metal halide lamp as recited in claim 6, wherein the tube is filled with argon gas to a pressure of 200 Torr at 300° K, 35 mg of mercury, 0.7 mg of dysprosium iodide, 7 mg of neodymium iodide, and 6 mg cesium iodide.

* * * * *